United States Patent [19]
Denyer et al.

[11] Patent Number: 5,847,344
[45] Date of Patent: Dec. 8, 1998

[54] POSITION SENSOR FOR TRANSMISSION GEAR SELECTOR SWITCH

[75] Inventors: Gary Joseph Denyer, Westland; Joseph B. Dierker, Jr., Troy; Mark Joseph Kane, Eastpointe; Vern Edward Welch, Reading, all of Mich.

[73] Assignee: Ford Global Technologies, Inc., Dearborn, Mich.

[21] Appl. No.: 676,827

[22] Filed: Jul. 8, 1996

[51] Int. Cl.[6] ............................... H01H 9/06; B60Q 1/00
[52] U.S. Cl. ........................................................ 200/61.88
[58] Field of Search ............................. 200/61.88–61.91; 74/334, 335; 192/0.052, 3.58; 340/456, 457; 477/99, 86; 307/10.1–10.8

[56] References Cited

U.S. PATENT DOCUMENTS

| | | | |
|---|---|---|---|
| 4,037,196 | 7/1977 | Atkinson et al. | 200/61.88 X |
| 4,100,530 | 7/1978 | deu Brinker et al. | 340/456 |
| 4,487,303 | 12/1984 | Boueri et al. | 192/0.052 |
| 4,604,506 | 8/1986 | Gebhardt | 200/61.89 |
| 4,610,179 | 9/1986 | Parker | 200/61.88 X |
| 4,882,572 | 11/1989 | Lippman et al. | 200/61.88 X |
| 4,896,135 | 1/1990 | Deeds et al. | 200/61.88 X |
| 4,914,594 | 4/1990 | Sano | 340/456 X |
| 5,023,414 | 6/1991 | Mihara et al. | 200/61.91 |
| 5,064,975 | 11/1991 | Boucher | 200/61.88 |
| 5,099,092 | 3/1992 | Lauritsen | 200/61.91 |
| 5,111,180 | 5/1992 | Suzuki | 340/456 |
| 5,191,178 | 3/1993 | Baker | 200/61.88 |
| 5,196,663 | 3/1993 | Kurozu et al. | 200/61.91 |
| 5,231,254 | 7/1993 | Baker et al. | 200/61.91 X |
| 5,325,083 | 6/1994 | Nassar et al. | 200/61.91 X |
| 5,338,907 | 8/1994 | Baker et al. | 200/61.88 |
| 5,440,087 | 8/1995 | Cobb, III | 200/61.88 |
| 5,512,875 | 4/1996 | Polityka | 200/61.88 |
| 5,525,768 | 6/1996 | Cobb, III et al. | 200/61.88 |
| 5,561,416 | 10/1996 | Marshall et al. | 200/61.88 |

*Primary Examiner*—J. R. Scott
*Attorney, Agent, or Firm*—Paul K. Godwin

[57] ABSTRACT

In an automatic transmission system, a position sensor provides digital and analog output indications of the sensed position of a manually operated transmission gear shift lever. Electrical contacts within the sensor are configured to minimize wear and corrosion by eliminating electrical continuity in the switching elements when the gear shift lever is in the Drive position.

9 Claims, 3 Drawing Sheets

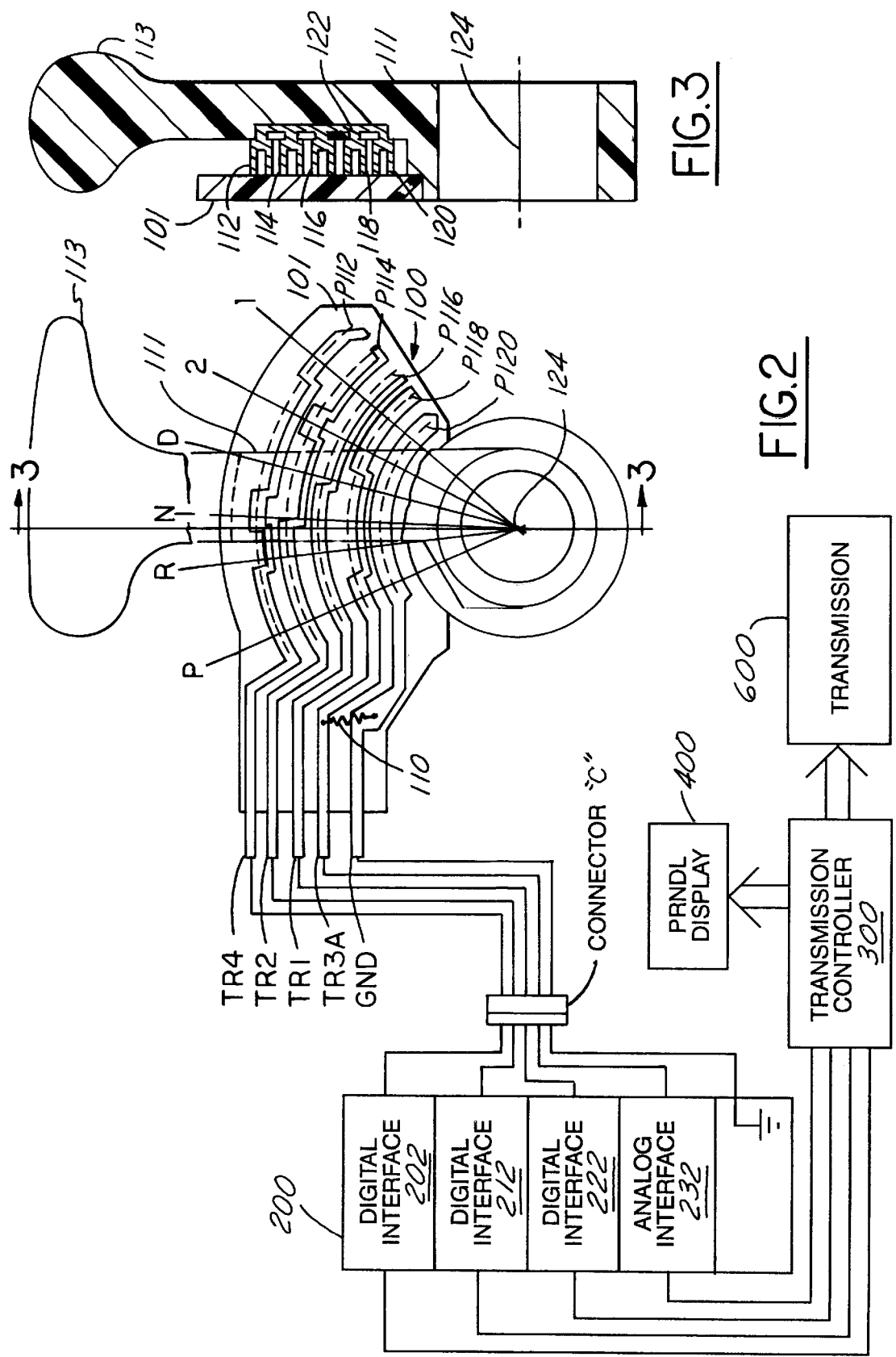

|  | TR4 | TR3A | TR2 | TR1 |
|---|---|---|---|---|
| P (Park) | 0 | 0 | 0 | 0 |
| R (Reverse) | 1 | 1 | 0 | 0 |
| N (Neutral) | 0 | 1 | 1 | 0 |
| D (Drive) | 1 | 1 | 1 | 1 |
| 2 (Second) | 1 | 0 | 0 | 1 |
| 1 (First) | 0 | 0 | 1 | 1 |

FIG. 6

POSITION SENSOR FOR TRANSMISSION GEAR SELECTOR SWITCH

BACKGROUND OF THE INVENTION

The present invention is directed to the field of automotive vehicles and more particularly to the gear selector for an automatic transmission.

Several types of position sensors for transmission gear selectors are known which use either a digital or analog scheme for determining position. Several types are discussed in commonly assigned U.S. Pat. No. 5,561,416, which is incorporated herein by reference to illustrate the state of the prior art.

In an automatic transmission, there are several settings of the gear shift position lever that are manually controlled and selected by the vehicle operator. The first position is called "Park" position in which the engine may be started and run, but is physically prevented from driving the wheels of the vehicles. In addition, when the transmission is in the Park position, at least the drive wheel is in a locked position and held so by the transmission gearing. A "Reverse" position is adjacent to the Park position and when placed in the Reverse position the transmission is configured so that the engine can transfer power to the drive wheel and cause the vehicle to move in the reverse direction. A "Neutral" position is adjacent to the Reverse position and allows free wheeling of the drive wheel separate from the propulsion energy offered by the engine. A "Driver" position is adjacent to the Neutral position and configures the transmission to provide propulsion power from the engine to rotate the drive wheel in the forward direction through a sequence of gears. The actual selection of gears is controlled by the speed of the vehicle, engine torque and power loads. Other forward gear positions which limit the gear ratio present between the engine and the drive wheel such as "Second" or "2" and "First" or "1" are also provided. These gears positions are collectively represented as "Low" or "L". This position range is commonly referred to as the "PRNDL" sensor.

When electrical contacts are used to sense the position of the gear shift levers it has been found that electrical contacts in the Drive position are most susceptible to corrosion, pitting and general deterioration because of the high use occurrence. When corrosion or pitting occurs, it is possible that the sequence of contacts, if read digitally, will provide erroneous codes. This may cause an associated transmission controller or a display device to provide erroneous information to either the transmission or the operator.

SUMMARY OF THE INVENTION

The present invention is directed to a position sensor for a transmission gear selector. It is used in an automatic transmission system on an automotive vehicle. That system includes a gear shift lever that is manually positionable to at least any one of the Park, Reverse, Neutral and Drive gear positions.

The sensor is formed on a substrate that contains a plurality of electrically conductive code traces disposed along separately defined trace paths on the substrate surface. Each code trace has predetermined contact areas formed at predetermined positions along each trace path. A wiper arm is connected to the gear shift lever to move in response to movement of the gear shift lever. The wiper arm contains a plurality of electrically conductive wiper contacts that are individually disposed in opposition to and in physical contact with the substrate surface. Each electrical contact is moveable with the wiper arm along a separate trace path so that in each position, the wiper contacts are in separately distinguishable states with respect to an associated trace path. Those states for each wiper contact are defined as a first conducting state when the wiper contact is physically opposed to and electrically contacting a contact area and a second non-conduct state where the wiper contact is not physically opposed to and not contacting a contact area. In the Drive gear position, the wiper contacts do not contact any of the contact areas in the code traces. An additional trace is provided as a common trace and an additional wiper contact is provided on the wiper arm to be in contact with the common trace. That common trace is connected to an electrical ground, and all wiper contacts on the wiper arm are commonly connected to each other within the wiper arm.

In order to provide a sufficient distinction in the coded output from the sensor, the traces are of a sufficient number and configuration to provide at least two changes in the contact states among the wiper contacts when the gear shift lever is moved from one to another of adjacent positions. In addition, the traces are configured to provide that all wiper contacts are in a first conducting state when the gear shift lever is in the park position.

BRIEF DESCRIPTION OF THE DRAWINGS

FIG. 2 is a sectional view of the position sensor of the present invention configured within its environment and shown connected to other represented elements.

FIG. 3 is a cross-sectional plan view of wiper arm 111 shown in FIG. 1.

FIG. 6 is a table that shows the binary codes for the various positions of the gear selector sensor of the present invention.

DETAILED DESCRIPTION OF THE PREFERRED EMBODIMENT

An example of an embodiment in which the invention claimed herein is advantageously used to determine the selected position of a transmission gear selector in an automotive vehicle is now described with particular reference to the attached figures.

Figure 1:
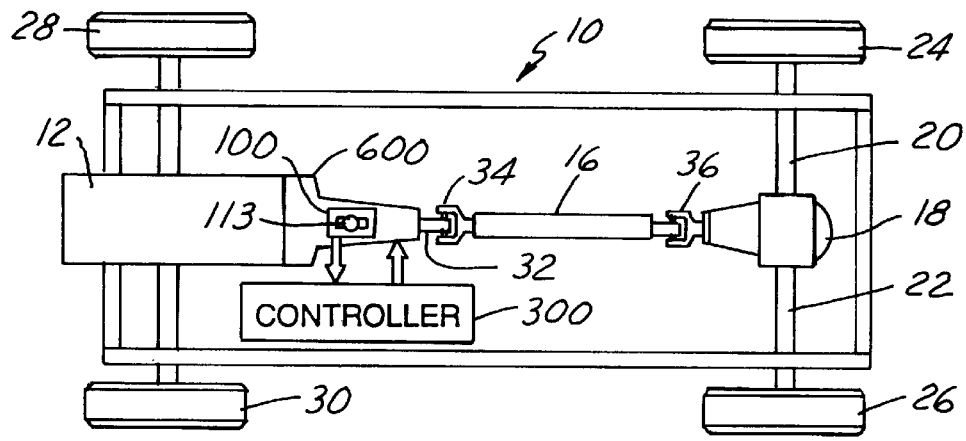
FIG. 1 is a elementary plan view of a vehicle that incorporates the present invention.

In FIG. 1, a vehicle layout 10 is conceptually provided to illustrate a prime mover engine 12 connected to a transmission 600. The transmission 600 provides torque to a drive wheel 24 via a shaft 32, a universal joint 34, a drive shaft 16, a universal joint 36, a differential gear 18 and an axle 20. Other components such as an axle 22 and wheels 26, 28 and 30 are also illustrated as common, but essential components of a typical vehicle. In addition to those components, a controller 300 is illustrated as being connected to receive gear shift lever position information from a gear selector position sensor 100 and to provide control signals to the transmission 600. A gear shift lever 113 is illustrated in FIG. 1 as being directly connected to the sensor 100.

FIG. 2 provides a more detailed illustration of sensor 100. Sensor 100 is mounted on a substrate 101, which in this case is the interior surface of a housing that is formed of an electrically insulative material, such as plastic. Electrically conductive metal traces TR1, TR2 and TR4 are attached to the surface of substrate 101 and each are disposed in respectively a separate trace paths P116, P114 and P112. These traces can be attached to the surface by any known manner such as by adhesives, rivets or screws or may be integrally formed on the surface by embossing or lithographic techniques. Traces TR1, TR2 and TR4 are designated as digital coded traces in the embodiment. Each digital trace is configured to provide a different pattern with separate contact areas defined along its respective trace paths. Each contact area is electrically connected in common with any other contact area that may be in the same trace path.

An additional code trace TR3A is provided in trace path P118 adjacent code trace TR1. TR3A forms the analog coded trace. A common trace "GND" also is provided with a continuous contact area along trace path 120. A resistor 110 is provided between the trace TR3A and the common trace GND.

Positions P, R, N, D, 2 and 1 are shown in FIG. 2 with radial lines sketched from a point that corresponds to axis 124. Each of the corresponding radials are shown to intersect different contact areas on the respective traces.

In FIG. 3, a wiper arm 111 is shown in cross-section as pivotally mounted with respect to housing 101 for rotation about an axis 124, which coincides with the axis of the corresponding gear shift lever 113 The wiper arm 111 also is shown in phantom lines FIG. 2, between axis 124 and shift lever 113. The wiper arm 111 contains several folk-like, spring-loaded electrical wiper contacts 112, 114, 116, 118 and 120 that are commonly joined by a bus bar 122 embedded in the wiper arm 111. The wiper arm 111 is postionable with the gear shift lever 113 to any of the P, R, N, D, 2 or 1 positions shown. As the wiper arm 111 is repositioned, the wiper contacts are swept along the surface of the substrate 101 in paths that correspond to the respective trace paths and either contact or do not contact defined contact areas. In this embodiment, the wiper arm 111 is formed of an electrically insulated material. However, it is conceived that the wiper arm itself could be made of an electrically conductive material and the electrical wiper contact could be merely extensions from the wiper arm and, as here, they would all be electrically connected in common.

In this case, the trace paths are shown as being concentric over a limited arcuate length that corresponds to the rotational movement of the corresponding gear shift lever 113 and the movement of the electrical contacts on the wiper arm 111. However, it is foreseen that the trace paths could also be configured in linear or curvilinear parallel paths, with a wiper arm mount and mechanism that tracks accordingly.

Each of the traces of the sensor 100 are electrically connected through a connector "C" to a digital interface module 200. In this case digital interface circuits 202, 212 and 222 are connected to digital coded traces TR4, TR2 and TR1, respectively. In addition, an analog interface circuit 232 is connected to analog coded trace TR3A and common trace GND is connected to electrical ground through the connector. The collective output of the interface circuits is provided in parallel to transmission controller 300. Controller 300 outputs control information to transmission 600. The output of controller 300 also may be input to a PRNDL display 400 that is remote from the actual location of gear shift lever 113 such as in the instrument panel of the vehicle. In the alternative, PRNDL display 400 could be connected directly to the interface circuits.

Figure 4:
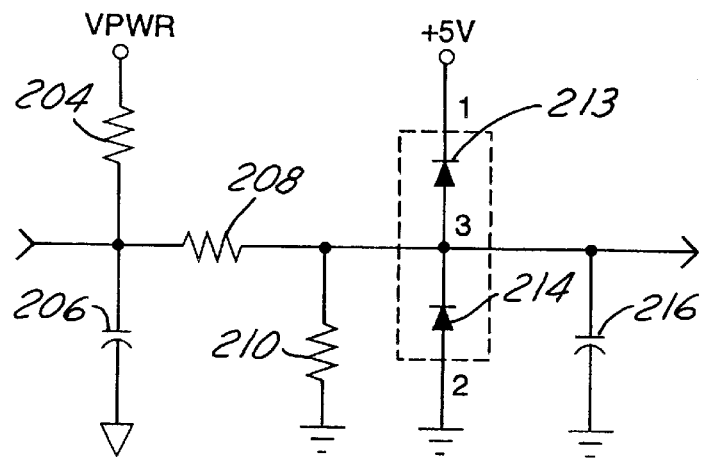
FIG. 4 is a circuit drawing of a digital interface circuit.

In FIG. 4, the circuit used for the digital interface circuits 202, 212 and 222 is represented. This circuit is replicated for connection to each of the 3 digital traces of sensor 100. A resistor 204 is connected between the vehicle power source which is generally between 10 and 16 volts DC, and the input terminal of the circuit. The input terminal is connected to a correspondingly associated digital trace of the sensor 100. A capacitor 206 is connected between the input terminal and ground. Resistors 208 and 210 exist between the input terminal and ground. The junction between resistors 208 and 210 is at a regulated level between series connected diodes 213 and 214. The anode of diode 213 is connected to a regulated 5 volt supply and the anode of diode 214 is connected to the cathode of diode 213 to form a regulated output junction. A capacitor 216 also is connected between that junction and ground. That junction is the output terminal of the circuit and is connected to an input of transmission controller 300.

When the input terminal of the digital interface circuit shown in FIG. 4 is grounded because an associated trace in the sensor 100 is grounded, the junction between the diodes 213 and 214 is also at ground potential. This provides a digital "0" output to transmission controller 300. Alternatively, when the input terminal is ungrounded (open) because a corresponding wiper contact is not in contact with the corresponding digital trace contact area, voltage from the vehicle power source is dropped across the voltage divider formed by resistors 204, 208 and 210. The voltage level at the junction between the diodes, and the output of the circuit is raised to a level that is limited to approximately 5 volts, less the voltage drop across the diode 214. This voltage level provides the digital or logical "1" output to transmission controller 300.

Figure 5:
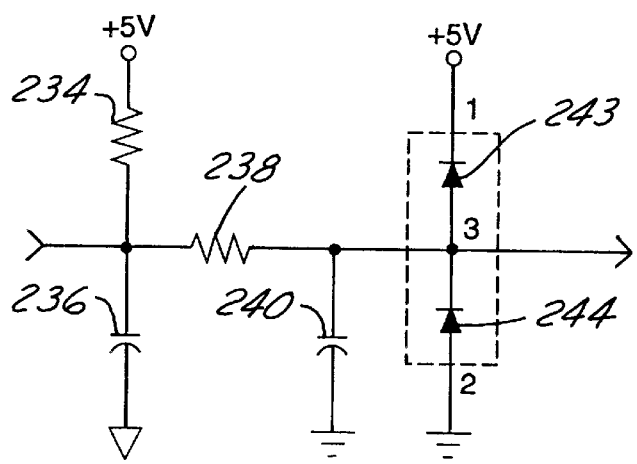
FIG. 5 is a circuit diagram of an analog interface circuit.

In FIG. 5, analog interface circuit 232 is shown wherein a resistor 234 is connected between a regulated 5 volt power supply and the input terminal of the circuit. The input terminal is connected through a connector C to the associated analog trace TR3A. A capacitor 236 is connected between the input terminal and ground. A resistor 238 is connected between the input terminal and a junction between series connected diodes 243 and 244. A capacitor 240 is connected between the diode junction and ground. Diodes 243 and 244 are connected in series between ground and the 5 volt regulated power supply and the junction between the diodes is also the output terminal that is connected to provide an analog input to transmission controller 300.

The analog circuit 232 shown in FIG. 5 provides 3 levels of output depending upon the sensed condition on the input terminal. The first condition is when trace TR3A is grounded because wiper contact 118 is electrically contacting the corresponding contact area of TR3A and wiper contact 120 is in contact with the common trace. In this event, the analog circuit 232 will provide an output of a logical 0 state that is between 0 and 1.0 volts. The second condition occurs when the wiper arm is positioned so that the electrical contact wiper 118 is not in contact with the contact area of trace TR3A. In this event, resistor 110 is connected between the input terminal of the circuit 232 and ground to provide a ground path from current flow from the +5 volt source through resistor 234. This provides an output voltage level that is between 1.3 volts and 2.3 volts. This is accepted as a logical "1" by the transmission controller 300. In addition, if the connector "C" between the sensor 100 and the interface unit 200 happens to be disconnected, the ground circuit is broken to the sensor and the input terminal of circuit 232 is not influenced by any voltage potential from sensor 100. The voltage at the input terminal increases in value due to the voltage drop between resistor 234 and 238. This causes the output of circuit 232 to go to relatively high voltage of approximately 2.6–5.0 volts and this is determined by transmission controller 300 as a "fault" signal.

A truth table is shown in FIG. 6. The binary codes provided to the transmission controller 300 are illustrated for the P, R, N, D, 2 and 1 positions. As can be seen from the truth table and from the sensor layout in FIG. 2, when gear shift lever 113 is in the Park position, all wiper contacts 112, 114, 116, 118 and 120 are contacting corresponding trace areas on each of the trace paths P112, P114, P116, P118 and P120—all logical "0". This is done for the purpose of burning off oxide film growth on the respective contacts with transient voltages generated during engine starts that occur while gear shift lever 113 is in the Park position.

Additional reference to the truth table in FIG. 6 and to FIG. 2 shows that in the Drive position, none of the digital or analog trace contact areas are positioned along trace path P112, P114, P116 and P118 and are not contacted by wiper contacts on wiper arm 111. This is done so as to avoid electrical fretting and corrosion of contacts in the position that is most susceptible to such deterioration. Normally such corrosion is accelerated when the electrical contact is continuously made, vibration occurs and temperatures increase. By not having any contact in the Drive position, which is the position of most frequent use, deterioration of the contacts should be minimized.

Additional reference to the truth table in FIG. 6 will show that in each adjacent position (from 1 to 2 to D to N to R to P and vice versa), at least 2 changes in contact states take place among the plurality of wiper contacts when the gear shift lever is moved from one to another of the adjacent positions. For instance, Reverse position is shown to have 1100 as the parallel logical code and Neutral position is shown to have 0110 logical code. When shifting from Reverse to Neutral, contact state changes take place in both traces TR4 and TR2. All adjacent positions contain similar logical differences. This ensures that any single trace or channel failure will be detected by transmission controller 300 and appropriate warnings will be given.

It should be understood that the present invention described herein is illustrative. Therefore, the terminology used is intended to be in the nature of words of description rather than limitation. It should be further understood that many modifications and variations of the present invention are possible in light of the above teachings. Therefore, it is believed that, within the scope of the appended claims, the present invention may be practiced otherwise than as specifically described.

We claim:

1. A transmission gear selector position sensor for use with an automotive automatic transmission system that includes a gear shift lever that is manually positionable to any one of at least a Park position, a Reverse gear position, a Neutral position and a Drive gear position, wherein the sensor comprises:

a substrate containing a plurality of electrically conductive code traces disposed along separately defined trace paths on the substrate surface with predetermined contact areas formed at predetermined positions along each trace path;

a wiper arm connected to said positionable gear shift lever to move in response to movement in said gear shift lever;

said wiper arm contains a plurality of electrical wiper contacts individually disposed in opposition to and in physical contact with said substrate surface, each electrical contact being movable with said wiper arm along a separate trace path;

each code trace being configured to be connected to circuitry for monitoring their respective electrical states;

wherein when said wiper arm is in each position said code traces are in separately distinguishable electrical states, defined as a first conducting state wherein said wiper contact is physically opposed to and electrically contacting a trace contact area and a second nonconducting state where said electrical contact is not physically opposed to and not contacting a trace contact area, and said code traces are of a sufficient number and configuration to provide at least two changes in the monitored states among the plurality of code traces when said gear shifter lever is moved from one position to another.

2. A transmission gear selector position sensor as in claim 1, wherein said traces are configured to provide that said wiper contacts are all in said first conducting state with each code trace when said gear shift lever is in said Park position.

3. A transmission gear selector position sensor as in claim 1, wherein said substrate contains an additional electrically conductive common trace disposed along a predefined common trace path with a predetermined common contact area that is coextensive with the movement of a first one of said wiper contacts and said first wiper contact is in contact with said common trace in each position.

4. A transmission gear selector position sensor as in claim 3, wherein said common trace is connected to an electrical ground.

5. A transmission gear selector position sensor as in claim 4, wherein said wiper contacts are commonly connected to each other within said wiper arm.

6. A transmission gear selector position sensor as in claim 5, wherein a plurality of said coded traces are designated as digital traces and said sensor further includes a sensor-control interface module that includes circuitry connected to each said digital trace to monitor and determine whether each said digital trace is in either a first electrically grounded state or a second electrically ungrounded state and provide a corresponding digital output signal.

7. A transmission gear selector position sensor as in claim 6, wherein at least one of said code traces separate from said digital traces is designated as an analog trace and said sensor further includes a resistor having a predetermined value connected between said analog trace and said common trace.

8. A transmission gear selector position sensor as in claim 7, wherein said sensor-control interface module includes circuitry connected to said analog trace to determine whether said analog trace is in a first electrically grounded state or a second ungrounded state with predetermined resistance to ground, and provide a corresponding first or second analog voltage level output signal, and to additionally determine whether said analog coded trace is in an open ungrounded state and provide a corresponding fault voltage level output signal when such an open ungrounded state is determined.

9. A transmission gear selector position sensor as in claim 8, said fault signal is defined to have a voltage level that is greater than either of said first and second analog voltage levels.

* * * * *